US012215895B2

(12) United States Patent
Choi et al.

(10) Patent No.: US 12,215,895 B2
(45) Date of Patent: Feb. 4, 2025

(54) CARBON MONOXIDE LEAK ALERTING DEVICE AND METHOD

(71) Applicant: NANOKEM CO., LTD., Gyeongsangbuk-do (KR)

(72) Inventors: Young-Hwan Choi, Seoul (KR); Sung-An Ha, Gyeongsangbuk-do (KR); Jung-Jae Jang, Incheon (KR)

(73) Assignee: NANOKEM CO., LTD., Gyeongsangbuk-do (KR)

( * ) Notice: Subject to any disclaimer, the term of this patent is extended or adjusted under 35 U.S.C. 154(b) by 0 days.

(21) Appl. No.: 17/769,116

(22) PCT Filed: Oct. 30, 2020

(86) PCT No.: PCT/KR2020/013941
§ 371 (c)(1),
(2) Date: Apr. 22, 2022

(87) PCT Pub. No.: WO2021/075825
PCT Pub. Date: Apr. 22, 2021

(65) Prior Publication Data

US 2024/0110727 A1 Apr. 4, 2024

(30) Foreign Application Priority Data

Oct. 16, 2019 (KR) ........................ 10-2019-0128265

(51) Int. Cl.
*F24H 9/20* (2022.01)
*F24F 11/38* (2018.01)
(Continued)

(52) U.S. Cl.
CPC ............ *F24H 9/2007* (2013.01); *F24F 11/38* (2018.01); *F24F 11/52* (2018.01); *G08B 21/14* (2013.01);
(Continued)

(58) Field of Classification Search
CPC ......... F24H 9/2007; F24F 11/38; F24F 11/52; F24F 2110/72; G08B 21/14; G08B 25/001
See application file for complete search history.

(56) References Cited

U.S. PATENT DOCUMENTS 10,373,126 B2 * 8/2019 Arensmeier ............. F24F 11/30
10,551,081 B1 * 2/2020 Miller-Russell ......... F24F 11/30
(Continued)

FOREIGN PATENT DOCUMENTS

JP H09-264548 A 10/1997
JP 2009-216407 A 9/2009
(Continued)

OTHER PUBLICATIONS

International Search Report dated Jan. 29, 2021 issued in PCT/KR2020/013941, 6 pages.
(Continued)

*Primary Examiner* — Mohamed Barakat
(74) *Attorney, Agent, or Firm* — Scully, Scott, Murphy & Presser, P.C.

(57) ABSTRACT

Provided is a carbon monoxide (CO) leak alerting device and method, and more specifically, a CO leak alerting device and method, whereby, by operating on the basis of the Internet of Things (IoT), a CO leak caused by damage to a boiler flue is detected, an alert is issued through two or more among the CO leak alerting device, a boiler controller and a wall pad, boiler ventilation and indoor air ventilation are automatically carried out when the leak is determined to have occurred, and authorities relevant to the CO leak, and a user are directly notified of the CO leak.

14 Claims, 5 Drawing Sheets

(51) Int. Cl.
*F24F 11/52* (2018.01)
*G08B 21/14* (2006.01)
*G08B 25/00* (2006.01)
*F24F 110/72* (2018.01)

(52) U.S. Cl.
CPC ........ *G08B 25/001* (2013.01); *F24F 2110/72* (2018.01)

(56) References Cited

U.S. PATENT DOCUMENTS

| | | | | |
|---|---|---|---|---|
| 11,079,127 | B2 * | 8/2021 | Tran | F24F 11/72 |
| 2002/0111132 | A1 | 8/2002 | Meneely, Jr. | |
| 2006/0049268 | A1 | 3/2006 | Weimer et al. | |
| 2011/0271914 | A1 * | 11/2011 | Richardson | F24H 15/395 122/14.1 |
| 2012/0034568 | A1 * | 2/2012 | Pachner | F23N 1/022 431/89 |
| 2017/0292725 | A1 * | 10/2017 | Conley | F24F 11/39 |
| 2018/0299159 | A1 | 10/2018 | Ajax et al. | |
| 2019/0172333 | A1 | 6/2019 | Combe | |
| 2020/0380836 | A1 * | 12/2020 | Harrison | G08B 21/14 |
| 2021/0222877 | A1 * | 7/2021 | Combe | G08B 17/10 |

FOREIGN PATENT DOCUMENTS

| | | | |
|---|---|---|---|
| KR | 10-1996-0014837 | A | 5/1996 |
| KR | 10-2011-0061695 | A | 6/2011 |
| KR | 20150021768 | A | 3/2015 |
| KR | 10-2017-0066906 | A | 6/2017 |
| KR | 10-2095203 | B1 | 5/2020 |

OTHER PUBLICATIONS

Extended European Search Report dated Apr. 5, 2023 received in EP Application No. 20876035.5, 8 pages.

Extended European Search Report dated Apr. 11, 2023 received in EP Application No. 20877129.5, 8 pages.

* cited by examiner

CARBON MONOXIDE LEAK ALERTING DEVICE AND METHOD

TECHNICAL FIELD

The present disclosure relates to a carbon monoxide (CO) leak alerting device and method, and more particularly, to a CO leak alerting device and method, whereby, by operating on the basis of the Internet of Things (IoT), a CO leak caused by damage to a boiler flue is detected, an alert is issued through two or more among the CO leak alerting device, a boiler controller, and a wall pad, boiler ventilation and indoor air ventilation are automatically carried out when the leak is determined to have occurred, and authorities relevant to the CO leak and a user are directly notified of the CO leak.

BACKGROUND ART

In general, a boiler burns fuel, such as coal, kerosene, diesel, etc. containing carbon elements to control water and indoor temperature.

Boilers generate carbon monoxide (CO) in the process of burning fuel containing carbon elements. CO is a colorless, odorless, tasteless, non-irritating gas that is harmful to the human body.

Therefore, the boiler is configured with a boiler flue, which is an exhaust pipe connected to the outside from the boiler in order to discharge CO generated in the boiler to the outside.

However, if the boiler flue is damaged on the inside or is connected incorrectly, there is a risk that CO may leak through a connected portion or broken portion of the exhaust pipe.

When CO leaks, it is difficult for humans to recognize the leak because CO is a colorless, odorless, tasteless, and non-irritating gas. In addition, if CO is inhaled by humans, it binds to hemoglobin in red blood cells and prevents oxygen from being delivered to tissues, so it is a dangerous gas that can take lives by hypoxia.

Indeed, CO leaks due to incorrect connection and aging of the boiler flue, and a large number of casualties occur frequently.

In order to detect and prevent a CO leak from a boiler, various CO leak detecting devices, such as Korean Utility Model Publication No. 20-2009-0007826 [HYBRID ALARM SYSTEM FOR BOILER], which are capable of measuring CO inside and around a boiler and issuing an alarm upon the measured CO exceeding a predetermined reference level have been developed and applied.

In general, an existing CO leak detecting device issues a CO alert when a reference time according to the level of the measured CO value is exceeded. Thus, the existing CO leak detecting device issues an alert only when the reference time according to the level is exceeded. That is, there is a problem that despite a sudden large CO amount leakage due to damage to a flue, etc., the existing CO leak detecting device issues an alert only when the reference time is exceeded, so a user may be put at risk.

In addition, the existing CO leak detecting device is installed separate from the user's living space, so even if the alarm sounds, the user may fail to recognize the alarm before being poisoned by CO while sleeping. If the alarm function of the leak detecting device is out of work, the user may be helplessly poisoned by CO.

In addition, even after the user hears the alarm of the CO leak detecting device and terminates the operation of the boiler or the operation of the boiler is automatically terminated by the CO leak detecting device, CO remains in the boiler and the CO inside the boiler may leak into the user's living space, and thus, the user still may be put at a risk.

In addition, the existing CO leak detecting device only issues an alert or terminates the operation of the boiler upon detection of a CO leak and the user should open windows in the living space by himself or herself to ventilate the CO leakage, possibly ending up at a risk of being continuously exposed to CO while losing consciousness.

DISCLOSURE OF INVENTION

Technical Problem

The present disclosure provides a CO leak alerting device and method, whereby, by operating on the basis of the Internet of Things (IoT), a CO leak caused by damage to a boiler flue is detected, an alert is issued through two or more among the CO leak alerting device, a boiler controller, and a wall pad, boiler ventilation and indoor air ventilation are automatically carried out when the leak is determined to have occurred, and authorities relevant to the CO leak and a user are directly notified of the CO leak.

Solution to Problem

In an aspect, a CO leak alerting device includes: a CO measuring unit comprising a CO measurement sensor installed at a location corresponding to a boiler flue, the CO measuring unit being configured to measure and output a CO amount leaking from a boiler through the CO measurement sensor; a collision detecting unit attached to the boiler flue and configured to detect a collision and an impact applied to the boiler flue and output a value of impact strength accordingly; an alert alarm unit configured to issue an alarm; and an alert controller configured to determine whether a CO leak is caused by separation of the boiler flue based on an impact on the boiler flue of the boiler through the collision detecting unit and a CO amount input to the CO measuring unit, and issue an alarm by controlling the alert alarm unit based on whether the CO leak is caused by the separation of the boiler flue.

The alert controller may include: a collision monitoring unit configured to monitor whether a collision is detected in the communication unit through the collision sensing unit, and obtain and output a value of impact strength of the collision when the collision is detected; a CO monitoring unit that monitors whether CO is detected through the CO measuring unit, and obtains and outputs a CO amount when CO is detected; and a CO leak determining unit configured to determine whether CO leaks due to separation of or damage to the boiler flue based on an impact strength and a CO amount, and issues an alarm through the alert alarm unit when it is determined that CO leaks due to the separation of or damage to the boiler flue.

The CO leak alerting device may further include an interface unit connected to a boiler ventilator for ventilating a combustion engine inside the boiler after post-purge and a control module for controlling the boiler ventilator to implement a post-purge mode, wherein the interface comprises a connection unit connected to the control module of the boiler, and the alert controller may further include a boiler leak handling unit configured to, based on a determination by the CO leak determining unit that CO leaks due to the separation of or damage to the boiler flue, output a post-purge request signal to the control module through the connection unit so that the boiler implements the post-purge mode.

The CO leak alerting device further includes: a communication unit connected to a wired or wireless data communication network by wire or wirelessly and configured to perform data communication with a wall pad connected to a ventilation system through the wired or wireless data communication network, and the alert controller may further include a ventilation handling unit configured to, when a CO leak caused by separation of or damage to the boiler is determined by the CO leak determining unit, output a ventilation request signal to a wall pad through a communication unit so as to issue an alert in response to the CO leak and drive the ventilation system to ventilate air in an indoor space where the boiler is installed.

The device further includes: a communication unit connected to a wired or wireless data communication network via a wire or wirelessly, and connected to a user mobile terminal of a pre-registered user in an indoor space through the wired or wireless data communication network to perform data communication, and the alert controller may further include a ventilation handling unit configured to, based on a determination by the CO leak determining unit that the CO leak is caused by the separation of or damage to the boiler flue, request an alert from the wall pad through the communication unit in response to the CO leak and output a ventilation request signal so as to request that the ventilation system be driven to ventilate air in an indoor space where the boiler is installed with external air so as to ventilate the air in the indoor space.

When an alert disabling event for any one or more of the alarm issued by the boiler leak processing unit and the alert issued through the user mobile terminal does not occur for a predetermined time, the leak notification unit may transmit CO leak notification information through the communication unit to a relevant authority server of a relevant authority connected to the wired or wireless data communication network.

In another aspect, a carbon monoxide (CO) leak alerting method includes: a collision monitoring process in which an alert controller monitors whether a collision is detected through a collision detection unit and acquires a value of impact strength of the collision in response to detecting the collision; a CO monitoring process in which the alert controller monitors whether CO is detected through a CO measuring unit, and obtains and outputs a CO amount in response to detection of CO; and an alert process in which the alert controller determines whether a CO leak is caused by separation of or damage to a boiler flue based on the value of impact strength and the CO amount, and the alert controller issues an alarm through an alert alarm unit in response to a determination that the CO leak is caused by the separation of or damage to the boiler flue.

The CO leak alerting method may further include: a boiler leak handling process in which when CO leak caused by the separation of or damage to the boiler flue is determined by the CO leak determining unit, the alert controller outputs a post-purge request signal to a control module of the boiler through a connection unit so that the boiler implements a post-purge mode.

The CO leak alerting method may further include: a ventilation handling process in which when CO leak caused by the separation of or damage to the boiler flue is determined by the CO leak determining unit, the alert controller outputs a ventilation request signal to a wall pad, which is connected to a ventilation system through a communication unit to control the ventilation system, so as to issue an alert in response to the CO leak and drive the ventilation system to ventilate air in an indoor space where the boiler is installed.

The CO leak alerting method may further include: a leak notification process in which when CO leak caused by separation of or damage to the boiler flue is determined by the CO leak determining unit, the alert controller transmits a CO leak message through a communication unit to a user mobile terminal of a pre-registered user, so that the user mobile terminal issues an alert in response to receiving the CO leak message.

The CO leak alerting method may further include: a relevant authority notifying process in which when an alert disabling event for any one or more of the alarm issued by the boiler leak processing unit and the alert issued through the user mobile terminal does not occur for a predetermined time, the alert controller transmits CO leak notification information through the communication unit to a relevant authority server of a relevant authority connected to the wired or wireless data communication network.

Advantageous Effects of Invention

In the present disclosure, since whether a CO leak is caused by damage to a boiler flue is determined and an alert can be issued upon a determination that the boiler flue is damaged, it is possible to more quickly respond the CO leak before a user is poisoned by CO.

In addition, in the present disclosure, since an alert is issued through a wall pad or a boiler controller installed in each room as well as an alert device, it is possible to more accurately notify the user of the CO leak.

In addition, in the present disclosure, since the boiler is stopped in response to detection of a CO leak and operated in a post-purge mode to ventilate gas inside the boiler, it is possible to minimize a possibility that remaining CO in the boiler leaks into the indoor space. However, the post-purge may not be performed when damage to the boiler flue is determined.

In addition, in the present disclosure, since an indoor ventilation system is operated through a wall pad in response to detection of a CO leak in order to ventilate indoor air to the outside, it is possible to minimize a possibility of CO poisoning of the user.

In addition, in the present disclosure, since when a CO leak is detected, the CO leak is notified to the user's smart phone or the like and an alert is issued, it is possible to quickly notify the user of the CO leak.

In addition, in the present disclosure, since the CO leak is notified to a relevant authority, it is possible to quickly rescue a user poisoned by CO.

BEST MODE FOR IMPLEMENTING THE INVENTION

Hereinafter, the configuration and operation of a carbon monoxide (CO) leak alerting device and a CO emission system according to the present disclosure will be described in detail with reference to the accompanying drawings, and a CO leak alerting method and a CO emission method in the corresponding device will be described.

Figure 1:
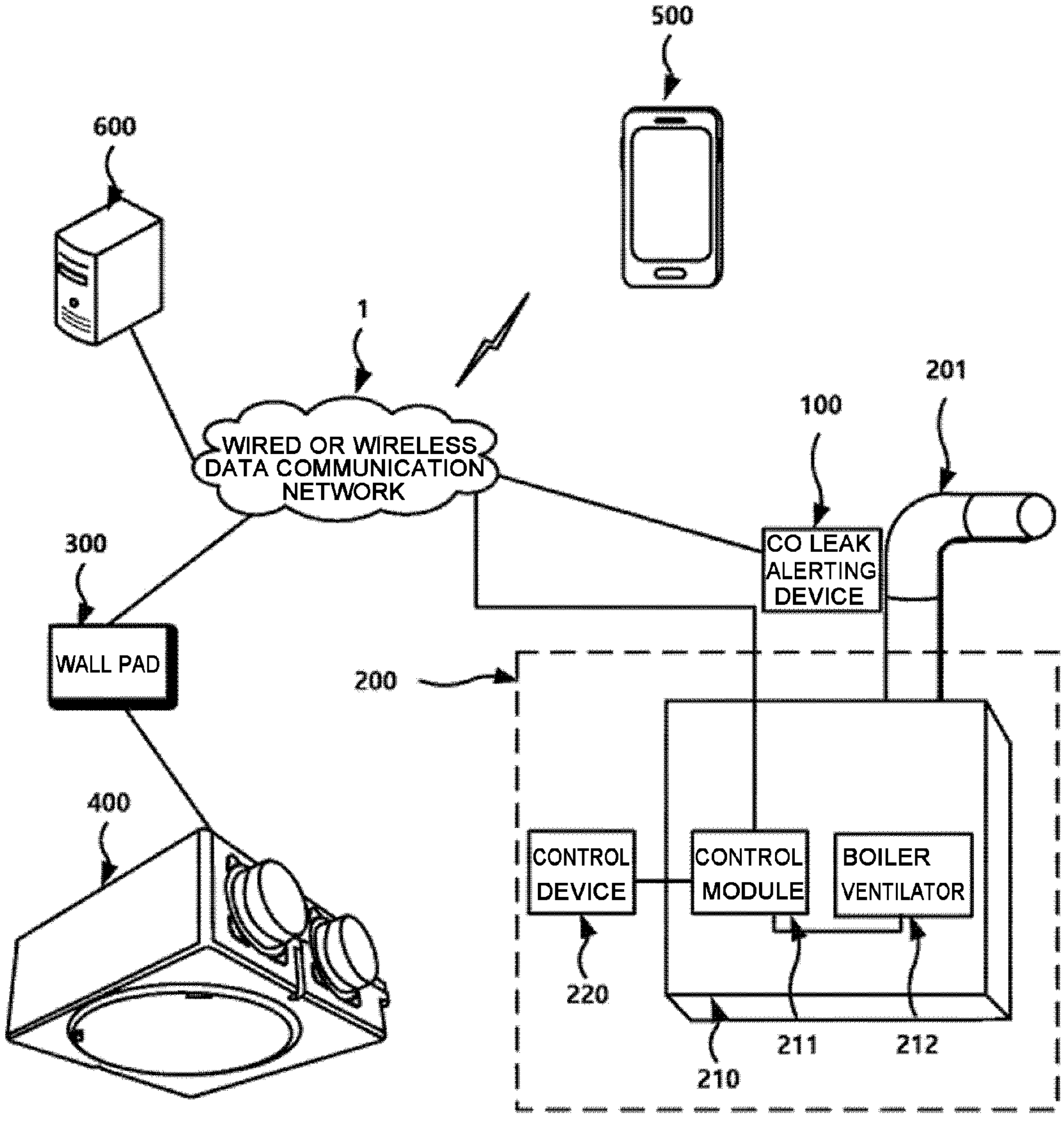
FIG. 1 is a diagram illustrating a configuration of a carbon monoxide (CO) emission system using a CO leak alerting device according to the present disclosure.

FIG. 1 is a diagram illustrating a configuration of a carbon monoxide (CO) emission system using a CO leak alerting device according to the present disclosure.

Referring to FIG. 1, the CO emission system using a CO leak alerting device according to the present disclosure may include a CO leak alerting device 100 and a boiler 200. According to an embodiment, the CO emission system may further include a wall pad 300, a ventilation system 400, a user mobile terminal 500, and a relevant authority server 600 according to an embodiment.

The CO leak alerting device 100, the boiler 200, the wall pad 300, the user mobile terminal 500, and the relevant authority server 600 are connected to a wired or wireless data communication network 1 by wire or wirelessly to perform data communication with each other.

The wired and wireless data communication network 1 may be a data communication network that is a combination of any one or more of an Internet network, such as a Wi-Fi network and a local area network (LAN), a mobile communication network such as 3G, 4G and 5G, a WiBro network, etc.

The CO leak alerting device 100 detects an impact applied to a boiler flue 201 of the boiler 200, and measures a CO amount generated by the boiler 200. When the impact is detected, the CO leak alerting device 100 assumes, based on a value of impact strength or the measured CO amount, whether a CO leak is caused by separation of the boiler flue 201 or caused by another part (a connected part inside the boiler). That is, the CO leak alerting device 100 assumes whether the CO leak is caused by the impact or by natural aging and an installation error.

When it is assumed that the CO leak is caused by the separation of the boiler flue 201, the CO leak alerting device 100 issues an alarm according to whether the CO leak is caused by the separation of or damage to the boiler flue 20 and transmits notification information on the CO leak to boiler 200. According to an embodiment, the CO leak alerting device 100 also transmits the notification information to the wall pad 300, the user mobile terminal 500, and the relevant authority server 600

The CO leak alerting device 100 distinguishes between a general CO leak and a CO leak caused by separation of or damage to the boiler flue 201, and in order to notify that the CO leak caused by separation of or damage to the boiler flue 201 is more dangerous, it may be preferable to set a louder alarm than a general CO leak alarm.

The boiler 200 includes a boiler body 210 and at least one control device 220 installed in each room of an indoor space in which the boiler 200 is installed.

The boiler body 210 includes a burner (not shown) for burning fuel (not shown), a boiler ventilator 212 for performing pre-purge and post-purge to discharge gas generated before and after combustion in the burner through the boiler flue 201, and a control module 211 for controlling operation of the boiler and controlling the boiler ventilator 212 to perform one of the pre-purge and the post-purge. The control module 211 may be connected to the wired or wireless data communication network 1 by wire or wirelessly. The boiler ventilator 212 may include an exhauster fan (not shown).

The control device 220 is installed in each room of an indoor space in which the boiler 200 is installed, and the control device 220 includes an output means for displaying operation information on the boiler according to an operation status of the control module, an input means for a user to operate the boiler, and an alerting means, and issues an alert through the alerting means in response to receiving CO leak notification information from the control module 211.

The wall pad 300 may be connected to the wired or wireless data communication network 1 by wire or wirelessly to perform data communication with the control module 211 of the boiler 200, the CO leak alerting device 100, the user mobile terminal 500, and the relevant authority server 600.

The wall pad 300 may include a display means (not shown) that is connected to the ventilation system (Energy Recovery Ventilation: ERV) 400 to provide the user with operation status information of the ventilation system 400 according to an operation of a manipulating means (not shown) and the wall pad 300.

The wall pad 300 includes an alerting means (not shown) capable of issuing an alert in the form of an alarm, flickering of the display means, etc., and when CO leak notification information is received from the CO leak alerting device 100, the wall pad 300 issues an alert through the alerting means and controls the ventilation system 400 to replace air in the indoor space, where the ventilation system 400 is provided, with external air so as to ventilate the air in the indoor space.

The ventilation system 400 is a general ERV well known to those skilled in the art, and thus it will not be described in detail.

The user mobile terminal 50, which is a terminal such as a smart phone or a smart pad that can connect to the wired and wireless data communication network 1, may be, for example, a terminal of an administrator who lives in the indoor space where the boiler 200 is installed or who administrates the indoor space.

According to the present disclosure, the user mobile terminal 500 receives the CO leak notification information directly from the CO leak alerting device 100 or through an application server (not shown) using an installed application, and issues an alert in response to receiving the CO leak notification information. The alert may be a sound such as alarm or voice, may be a vibration, may be flickering of the display means (not shown), or may be two or more of a sound, a vibration, and flickering. Depending on a type of the application server, the CO leak notification information may be transmitted in the form of a push message or a mobile communication message such as Short Message Service (SMS), Long Message Service (LMS), Multimedia Message Service (MMS), and when the CO leak notification information is transmitted in the form of the push message or the mobile communication message, it may be preferable to issue an alert based on information on a sender who has sent the push message or the mobile communication message.

The relevant authority server 600, which is a server configured in a relevant authority such as 911 rescue headquarters and police stations, issues an alert in response to receiving the CO leak notification information and displays the CO leak notification information. The CO leak notification information may include information on a geographic location where the boiler is installed.

Figure 2:
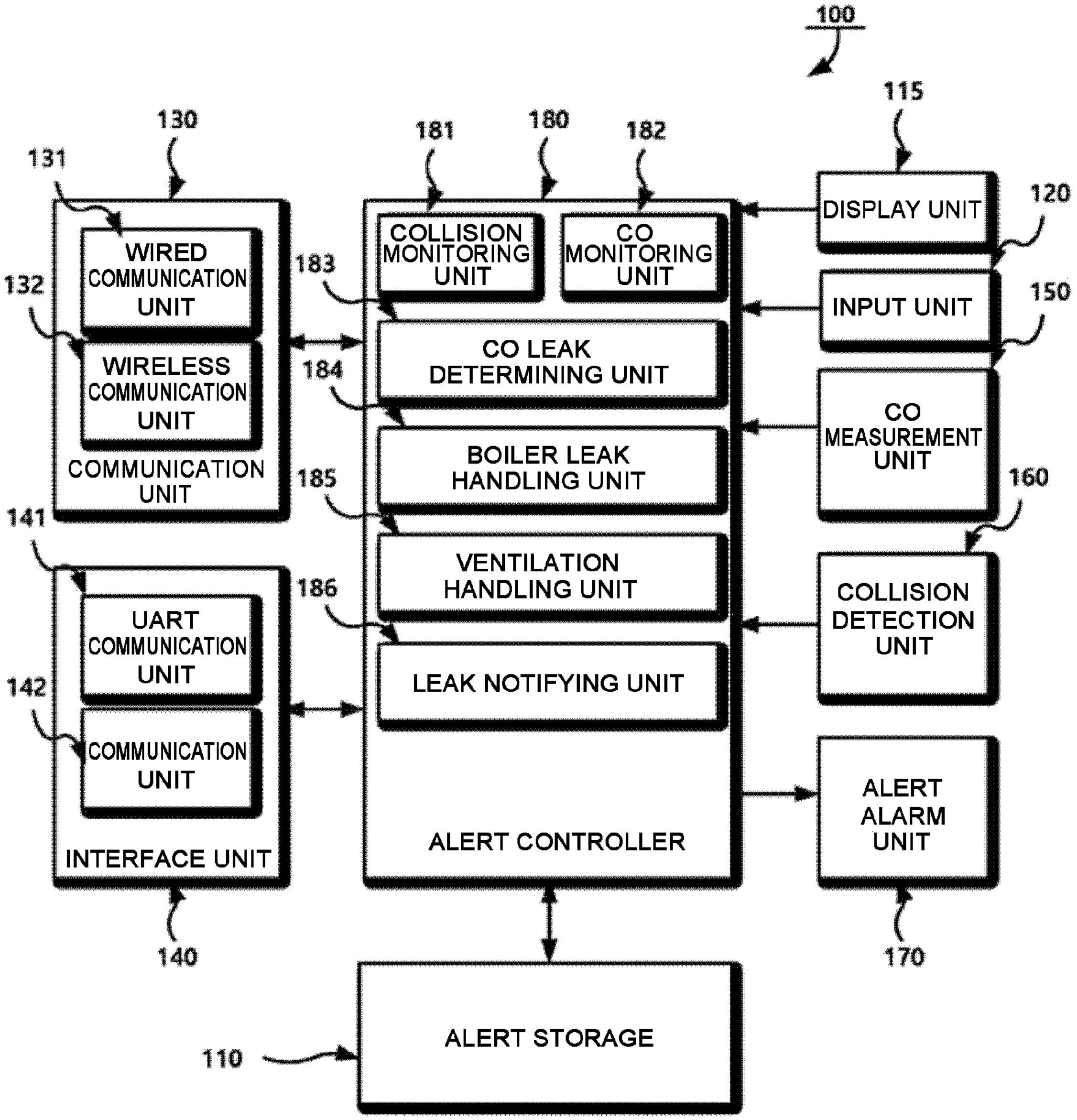
FIG. 2 is a diagram illustrating a detailed configuration of a CO leak alerting device according to the present disclosure.

FIG. 2 is a diagram illustrating a detailed configuration of a CO leak alerting device according to the present disclosure.

Referring to FIG. 2, the CO leak alerting device 100 includes an alert storage 110, a CO measuring unit 150, a collision detecting unit 160, an alert alarm unit 170, and an alert controller 180. According to an embodiment, the CO leak alerting device 100 may further include a display unit 115, an input unit 120, a communication unit 130, and an interface unit 140.

The alert storage 110 includes a program region for storing a control program for controlling overall operations of the CO leak alerting device 100 according to the present disclosure, a temporary region for temporarily storing data generated during execution of the control program, and a data region for semi-permanently storing any one or more of data generated during execution of the control program or data required to execute the control program.

The data region may store wall pad identification information on the wall pad 300, user mobile terminal identification information, relevant authority information, etc. The wall pad identification information may be network address information of the wall pad, a phone number, etc., the user mobile terminal identification information may be a phone number of the user mobile terminal 500, etc., and the relevant authority information may be network address information, a phone number that can receive a text and data, etc.

The display unit 115 displays various types of information, such as operation status information of the CO leak alerting device 100 according to the present disclosure, buttons for operation, etc. in the form of any one or more of text and graphics on the screen.

The input unit 120 may include any one or more of the following: a key input device having a plurality of keys for setting connection information for connection with the wall pad 300, a phone number of the user mobile terminal 500, etc.; and a touch pad formed integrally with a screen of the display unit 115 to output a position signal corresponding to a touched position.

The communication unit 130 includes a wired communication unit 131 connected to the wired or wireless data communication network 1 by wire to perform data communication, and a wireless communication unit 132 connected to the wired or wireless data communication network 1 wirelessly to perform data communication.

The wireless communication unit 132 may be a wireless local area communication (Wireless LAN) device, and may be connected to a WiFi network of the wired or wireless data communication network 1 to perform wireless data communication.

The interface unit 140 may include a universal asynchronous receiver/transmitter (UART) communication unit 141 connected to the wall pad 300 to perform serial-data communication, and a connection unit 142 directly connected to the control module 211 of the boiler 200 to enable communication between the wall pad 300 and the alert controller 180 and communication between the control module 211 and the alert controller 180.

The CO measuring unit 150 measures a CO amount through a CO measurement sensor installed within a predetermined distance from the boiler 200 and the boiler flue 201, and outputs the measured CO amount to the alert controller 180.

The collision detecting unit 160 includes a collision detection sensor connected to an arbitrary location in the boiler flue 201 and detects whether a collision has occurred in the boiler flue 201, measures a value of impact strength according to a detected collision, and outputs an alarm to the alert controller 180. The collision detection sensor may be an accelerometer or the like.

The alert alarm unit 170 issues an alarm under the control of the alert controller 180.

The alert controller 180 includes a collision monitoring unit 181, a CO monitoring unit 182, a CO leak determining unit 183, a boiler leak handling unit 184, a ventilation handling unit 185, and a leak notification unit 186 to control the overall operations of the CO leak alerting device 100 according to the present disclosure.

Specifically, the collision monitoring unit 181 monitors whether a value of impact strength is input through the collision detecting unit 160, and when the value of impact strength is input, the collision monitoring unit 181 outputs the value of impact strength to the CO leak determining unit 183.

The CO monitoring unit 182 monitors whether a value of CO amount is input through the CO measuring unit 150 so as to continuously monitor whether CO is detected, and when the value of the CO amount is input, the CO monitoring unit 182 outputs the value of CO amount to the CO leak determining unit 183.

The CO leak determining unit 183 receives the value of impact strength from the collision monitoring unit 181 and the value of CO amount from the CO monitoring unit 182, and determines whether the boiler flue 201 is separated or damaged based on the value of impact strength and the value of CO amount. For example, when the value of impact strength is equal or greater than a first reference strength value and the value of CO amount exceeds a first reference CO amount value, the CO leak determining unit 183 may determine that the boiler flue 201 is separated by 10% or X % of the area of the boiler flue 201 is damaged due to an impact, and when the value of impact strength exceeds the first reference strength value and the value of CO amount exceeds a second reference CO amount value (the second reference CO amount value>the first reference CO amount value), the CO leak determining unit 183 may determine that the boiler flue 201 is separated by 20% or Y % of the area of the boiler is damaged (creation of a hole). The first reference strength value, the first reference CO amount value, the second reference CO amount value, and the like may be determined through an experiment.

When the value of impact strength is greater than or equal to the first reference strength value even though no impact has occurred, the CO leak determining unit 183 may determine that the boiler flue 201 is separated due to a boiler flue connection defect or the like. Even in this case, the CO leak determining unit 183 may perform the same process as in the case where the boiler flue 201 is separated or damaged due to an impact.

When it is determined that the boiler flue 201 is separated or damaged and the CO leaks, the CO leak determining unit 183 issues an alert through the alert alarm unit 170.

When the CO leak determining unit 183 determines that the CO leak is caused by separation of or damage to the boiler flue 201, the boiler leak handling unit 185 transmits CO leak notification information through the connection unit 142 to the control module 211 of the boiler 200.

Receiving the CO leak notification information, the control module 211 of the boiler 200 recognizes the CO leak notification information as a post-purge request signal and controls the boiler ventilator 212 to perform post-purge.

When the CO leak determining unit 183 determines that the CO leak is caused by separation of or damage to the boiler flue 201, the ventilation handling unit 185 transmits CO leak notification information to the wall pad 300 through the UART communication unit 141.

Then, the wall pad 300 may issue an alert through the alerting means and control the ventilation system 400 to ventilate air of the indoor space, in which the boiler 200 is installed, with external air.

When the CO leak determining unit 183 determines that the CO leak is caused by separation of or damage to the boiler flue 201, the leak notification unit 186 transmits CO leak notification information to any one or more of a user mobile terminal 500 of a user pre-registered in the alert storage 110 and the relevant authority server 600.

As described above, the CO leak notification information may include location information on a geographic location where the boiler is installed, a date, a time, whether the boiler flue is damaged, a value of CO amount, and the like.

Receiving the CO leak notification information, the user mobile terminal 500 and the relevant authority server 600 may issue an alert and display the CO leak notification information through the display means (not shown).

Figure 3:
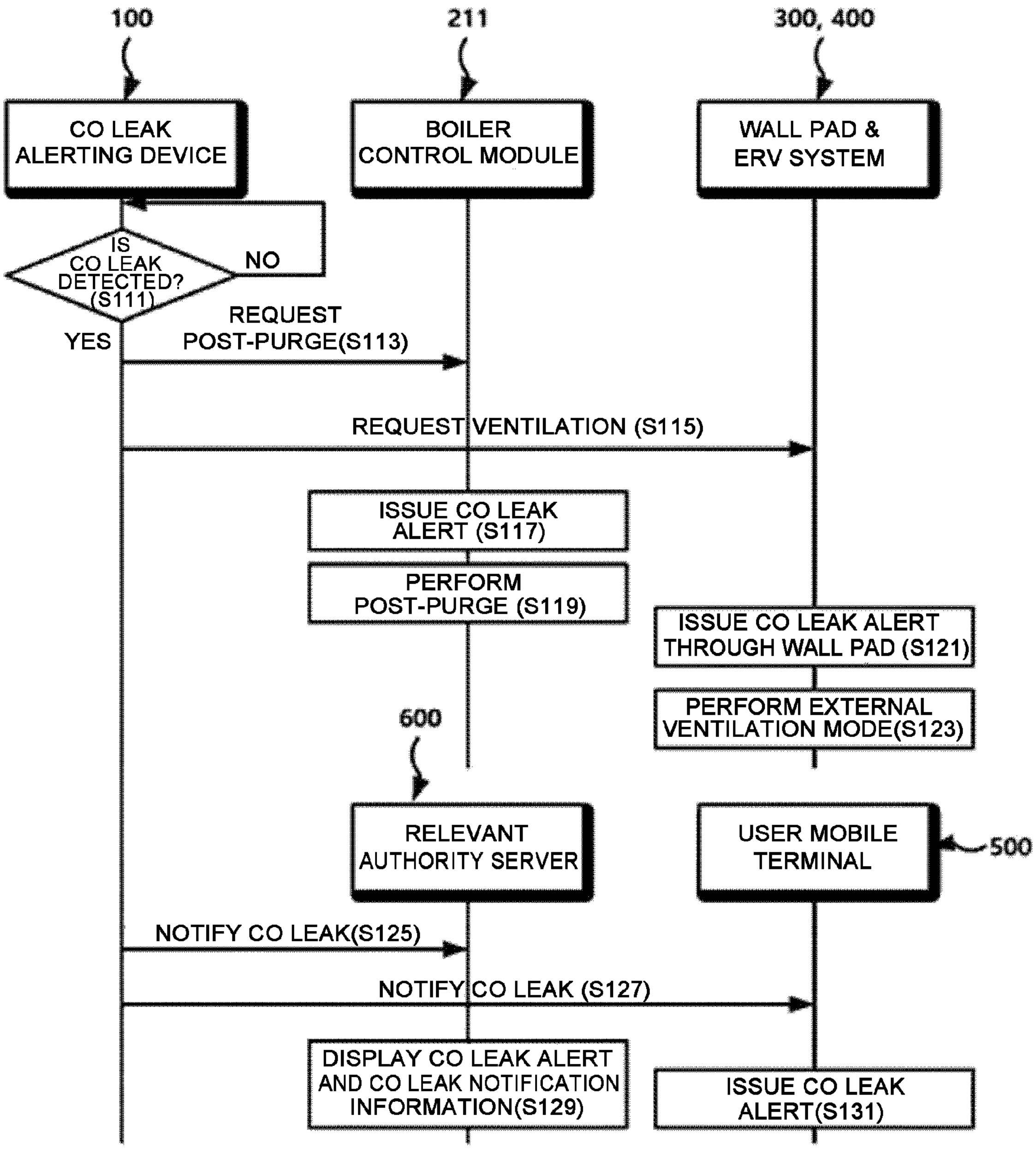
FIG. 3 is a flowchart illustrating a CO emission method according to the present disclosure.

FIG. 3 is a flowchart illustrating a CO emission method according to the present disclosure.

Referring to FIG. 3, the alert controller 180 of the CO leak alerting device 100 first monitors whether a CO leak caused by separation of or damage to the boiler flue 201 is detected in operation S111.

When the CO leak caused by separation of or damage to the boiler flue 201 is detected, the alert controller 180 transmits CO leak notification information to the control module 211 of the boiler 200 as a post-purge request signal and to the wall pad 300 as a ventilation request signal in operations S113 and S115.

When the ventilation request signal is received, that is, when CO leak notification information is received, the control module 211 of the boiler 200 issues an alert indicating a CO leak through an alerting means (not shown) of the boiler itself or through the control device 220 installed in each room in operation S115.

After issuing the alert, the control module 211 controls the boiler ventilator 212 to perform post-purge, so that gas existing in a burner (not shown), a pipe (not shown), and the boiler flue 201 of the boiler 200 is discharged to the outside in operation S117.

Meanwhile, the wall pad 300 issues a CO leak alert through an alerting means (not shown) in operation S121, and controls the ventilation system 400 to implement an external ventilation mode in operation S123.

In addition, according to an embodiment, the alert controller 180 of the CO leak alerting device 100 may transmit CO leak notification information to the relevant authority server 600 and the user mobile terminal 500 in operations S125 and S127.

Receiving the CO leak notification information, the relevant authority server 200 may issue an alert to a relevant division in a corresponding relevant authority and display the CO leak notification information in operation S127.

Receiving the CO leak notification information, the user mobile terminal 500 may also issue an alert in operation S131. The user mobile terminal 500 may also be configured to display the CO leak notification information.

Figure 4:
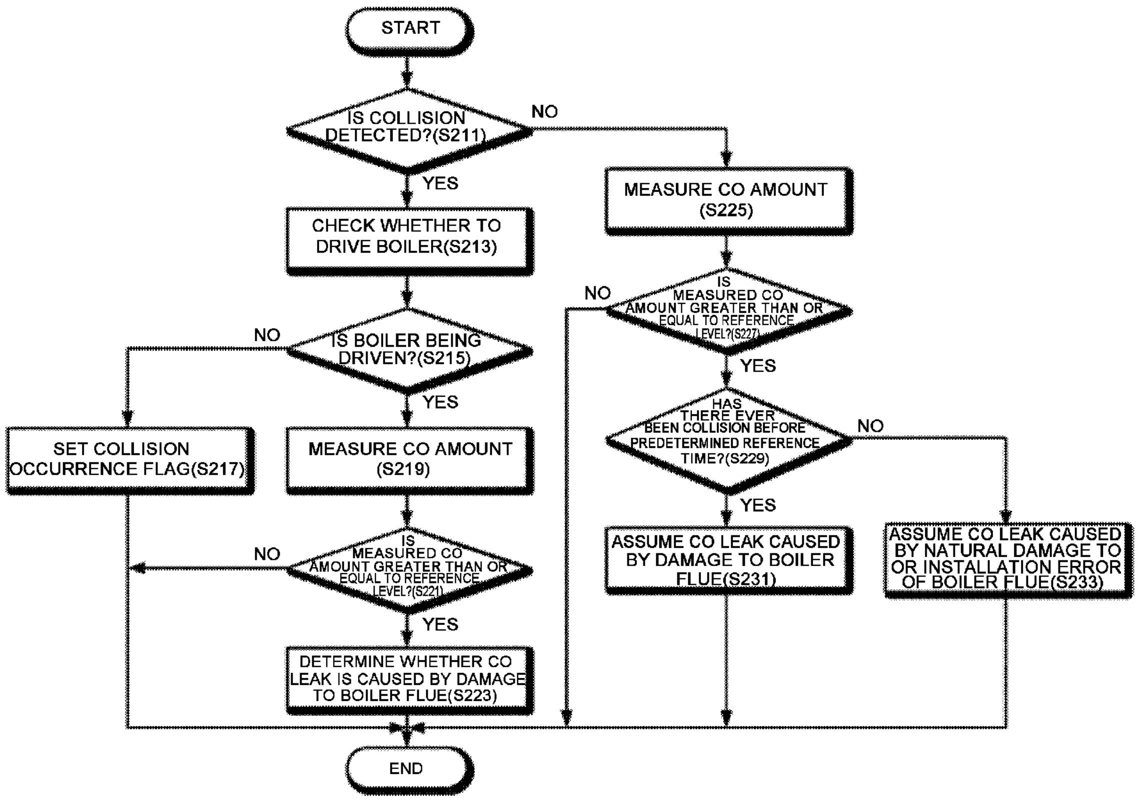
FIG. 4 is a flowchart illustrating a CO leak alerting method of the CO leak alerting device according to the present disclosure.

FIG. 4 is a flowchart illustrating a CO leak alerting method of a CO leak alerting device according to the present disclosure, which is a flowchart illustrating a method of determining a CO leak caused by an exhaust port damage in the CO leak alerting device.

Referring to FIG. 4, the alert controller 180 monitors whether a collision is detected through the collision detecting unit 160 in operation S211.

When the collision is detected, the alert controller 180 may check whether to drive the boiler through the control module 211 of the boiler 200 in operation S213.

After checking whether to drive the boiler, the alert controller 180 determines whether the boiler is being driven in operation S215, and when the boiler is not being driven, the alert controller 180 sets a collision occurrence flag indicating that the collision has occurred in operation S217.

On the other hand, when the boiler is being driven, the alert controller 180 measures a CO amount through the CO measuring unit 150 in operation S219.

When the CO amount is measured, the alert controller 180 checks whether the measured CO amount exceeds a reference CO amount value in operation S221.

When the measured CO amount exceeds the reference CO amount value, a CO leak caused by damage to the boiler flue 201 is determined.

In the above description, whether a CO leak is caused by damage to the boiler flue 201 is determined only based on whether the boiler flue 201 is damaged and a single CO reference amount; however, it is also possible to precisely estimate a degree of separation of or damage to the boiler flue by comparing a collision intensity and a CO amount with a plurality of reference levels having different values of collision strength and different values of CO amount.

On the other hand, when no collision is detected in the boiler flue 201, the alert controller 180 measures a CO amount through the CO measuring unit 150 in operation S225.

After measuring the CO amount, the alert controller 180 determines whether the measured CO amount is greater than or equal to a preset reference CO amount value in operation S227.

When the measured CO amount is greater than or equal to the reference CO amount value, the alert controller 180 examines the collision occurrence flag and determines whether the collision has occurred within a predetermined reference time based on whether the collision occurrence flag is set in operation S229.

When the collision has occurred within the predetermined time, the alert controller 180 assumes a CO leak caused by damage to the boiler flue in operation S231.

However, when no collision has occurred within the predetermined time, the alert controller 180 assumes a CO leak caused by a natural damage or installation error of the boiler flue 201 in operation S233.

Figure 5:
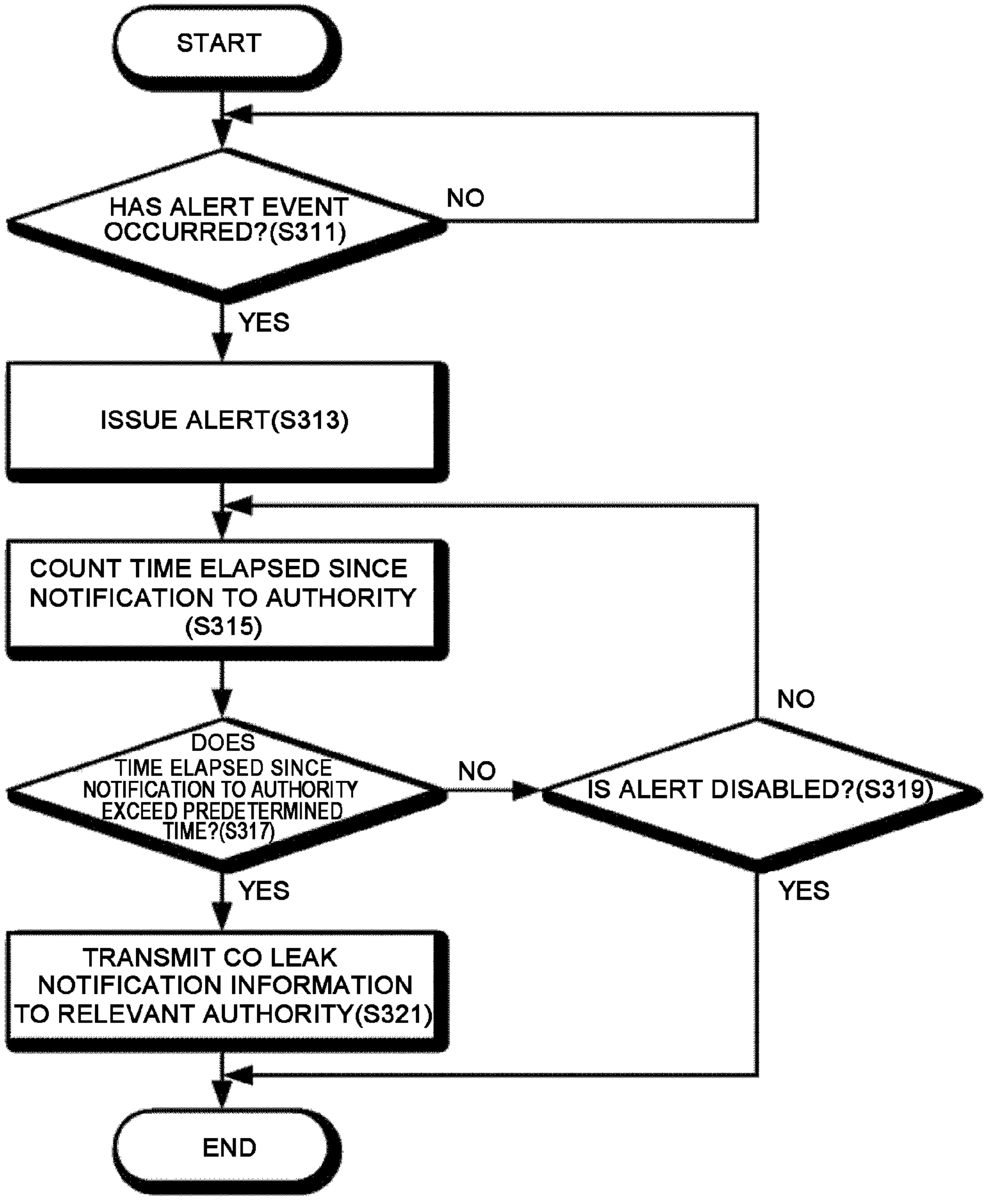
FIG. 5 is a flowchart illustrating a method of notifying relevant authorities in a CO emission method according to the present disclosure.

FIG. 5 is a flowchart illustrating a relevant authority notifying method in a CO emission method according to the present disclosure, which is a flow chart that can be performed in any one or more of the CO leak alerting device 100, the control module 211, the wall pad 300, and the user mobile terminal 500. However, for convenience of explanation, the following description is limited to a case where the relevant authority notifying method is performed in the user mobile terminal 500.

The user mobile terminal 500 examines whether an alert event has occurred upon reception of CO leak notification information from the CO leak alerting device 100 in operation S311.

When the alert event has occurred, the user mobile terminal 500 issues an alert in operation S313.

After the alert is issued, the user mobile terminal 500 counts a time elapsed since notification to an authority in operation S315, checks whether the counted time elapsed since notification to the authority exceeds a preset predetermined reference time in operation S317, and checks whether the alert is disabled within the predetermined reference time in operation S319.

When the alert is disabled before the time elapsed since the notification to the authority exceeds the reference time, the procedure ends, and when the alert is not disabled until the time elapsed since the notification to the authority exceeds the reference time, CO leak notification information is transmitted to a preset relevant authority server 600 in operation S321.

Meanwhile, the present disclosure is not limited to the above-described typical preferable embodiments, and those skilled in the art will appreciate that various modifications, changes, substitutions, or additions are possible, without departing from the gist of the present disclosure. The technical spirit of those modifications, changes, substitutions, or additions may be construed as being included in the present disclosure if the practice thereof belongs to the scope of the accompanying claims.

DETAILED DESCRIPTION OF MAIN ELEMENTS

| | |
|---|---|
| 100: CO leak alerting device | 110: alert storage |
| 115: display unit | 120: input unit |
| 130: communication unit | 131: wired communication unit |
| 132: wireless communication unit | 140: interface unit |
| 141: UART communication unit | 142: connection part |
| 150: CO measuring unit | 160: collision detecting unit |
| 170: alert alarm unit | 180: alert controller |
| 181: collision monitoring unit | 182: CO monitoring unit |
| 183: CO leak determining unit | 184: boiler leak handling unit |
| 185: ventilation handling unit | 186: leak notification unit |
| 200: boiler | 201: boiler flue |
| 210: boiler body | 211: control module |
| 212: boiler ventilator | 220: control device |
| 300: wall pad | 400: ventilation system |

500: user mobile terminal

What is claimed is:

1. A carbon monoxide (CO) leak alerting device comprising:

a CO measuring unit comprising a CO measurement sensor installed at a location corresponding to a boiler flue, the CO measuring unit being configured to measure and output a CO amount leaking from a boiler through the CO measurement sensor;

a collision detecting unit attached to the boiler flue and configured to detect a collision and an impact applied to the boiler flue and output a value of impact strength accordingly;

an alert alarm unit configured to issue an alarm; and an alert controller configured to determine whether a CO leak is caused by separation of the boiler flue based on an impact on the boiler flue of the boiler through the collision detecting unit and a CO amount input to the CO measuring unit, and issue an alarm by controlling the alert alarm unit based on whether the CO leak is caused by the separation of the boiler flue.

2. The CO leak alerting device of claim 1, wherein the alert controller comprises: a collision monitoring unit configured to monitor whether a collision is detected in the boiler flue through the collision detecting unit, and obtain and output a value of impact strength of the collision when the collision is detected;

a CO monitoring unit that monitors whether CO is detected through the CO measuring unit, and obtains and outputs a CO amount when CO is detected; and a CO leak determining unit configured to determine whether CO leaks due to separation of or damage to the boiler flue based on an impact strength and a CO amount, and issues an alarm through the alert alarm unit when it is determined that CO leaks due to the separation of or damage to the boiler flue.

3. The CO leak alerting device of claim 2, further comprising:

an interface unit connected to a boiler ventilator for ventilating a combustion engine inside the boiler after post-purge and a control module for controlling the boiler ventilator to implement a post-purge mode, wherein the interface comprises a connection unit connected to the control module of the boiler, wherein the alert controller further comprises a boiler leak handling unit configured to, based on a determination by the CO leak determining unit that CO leaks due to the separation of or damage to the boiler flue, output a post-purge request signal to the control module through the connection unit so that the boiler implements the post-purge mode.

4. The CO leak alerting device of claim 2, further comprising:

a communication unit connected to a wired or wireless data communication network by wire or wirelessly and configured to perform data communication with a wall pad connected to a ventilation system through the wired or wireless data communication network, wherein the alert controller further comprises a ventilation handling unit configured to, when a CO leak caused by separation of or damage to the boiler is determined by the CO leak determining unit, output a ventilation request signal to a wall pad through a communication unit so as to issue an alert in response to the CO leak and drive the ventilation system to ventilate air in an indoor space where the boiler is installed.

5. The CO leak alerting device of claim 3, further comprising:

a communication unit connected to a wired or wireless data communication network via a wire or wirelessly, and connected to a user mobile terminal of a pre-registered user in an indoor space through the wired or wireless data communication network to perform data communication, wherein the alert controller further comprises a leak notification unit configured to, based on a determination by the CO leak determining unit that the CO leak is caused by the separation of or damage to the boiler flue, request an alert from the wall pad through the communication unit in response to the CO leak and output a ventilation request signal so as to request that a ventilation system be driven to ventilate air in an indoor space where the boiler is installed with external air so as to ventilate the air in the indoor space.

6. The CO leak alerting device of claim 5, wherein when an alert disabling event for any one or more of the alarm issued by the boiler leak handling-unit and the alert issued through the user mobile terminal does not occur for a predetermined time, the leak notification unit transmits CO leak notification information through the communication unit to a relevant authority server of a relevant authority connected to the wired or wireless data communication network.

7. A carbon monoxide (CO) leak alerting method comprising:

a collision monitoring process in which an alert controller monitors whether a collision is detected through a collision detection unit and acquires a value of impact strength of the collision in response to detecting the collision;

a CO monitoring process in which the alert controller monitors whether CO is detected through a CO measuring unit, and obtains and outputs a CO amount in response to detection of CO; and an alert process in which the alert controller determines whether a CO leak is caused by separation of or damage to a boiler flue based on the value of impact strength and the CO amount, and the alert controller issues an alarm through an alert alarm unit in response to a determination that the CO leak is caused by the separation of or damage to the boiler flue.

8. The CO leak alerting method of claim 7, further comprising:

a boiler leak handling process in which when a CO leak caused by the separation of or damage to the boiler flue is determined by a CO leak determining unit, the alert controller outputs a post-purge request signal to a control module of the boiler through a connection unit so that a boiler implements a post-purge mode.

9. The CO leak alerting method of claim 7, further comprising:

a ventilation handling process in which when a CO leak caused by the separation of or damage to the boiler flue is determined by a CO leak determining unit, the alert controller outputs a ventilation request signal to a wall pad, which is connected to a ventilation system through a communication unit to control the ventilation system, so as to issue an alert in response to the CO leak and drive the ventilation system to ventilate air in an indoor space where a boiler is installed.

10. The CO leak alerting method of claim 7, further comprising:

a ventilation handling process in which when a CO leak caused by the separation of or damage to the boiler flue is determined by a CO leak determining unit, the alert controller outputs a ventilation request signal to a wall pad, which is connected to a ventilation system through a communication unit to control the ventilation system, so as to issue an alert in response to the CO leak and drive the ventilation system to ventilate air in an indoor space where the boiler is installed.

11. The CO leak alerting method of claim 10, further comprising:

a relevant authority notifying process in which when an alert disabling event for any one or more of the alarm issued by a boiler leak processing unit and the alert issued through the user mobile terminal does not occur for a predetermined time, the alert controller transmits CO leak notification information through the communication unit to a relevant authority server of a relevant authority connected to a wired or wireless data communication network.

12. The CO leak alerting method of claim 8, further comprising:

a ventilation handling process in which when a CO leak caused by the separation of or damage to the boiler flue is determined by the CO leak determining unit, the alert controller outputs a ventilation request signal to a wall pad, which is connected to a ventilation system through a communication unit to control the ventilation system, so as to issue an alert in response to the CO leak and drive the ventilation system to ventilate air in an indoor space where the boiler is installed.

13. The CO leak alerting method of claim 8, further comprising:

a leak notification process in which when a CO leak caused by separation of or damage to the boiler flue is determined by the CO leak determining unit, the alert controller transmits a CO leak message through a communication unit to a user mobile terminal of a pre-registered user, so that the user mobile terminal issues an alert in response to receiving the CO leak message.

14. The CO leak alerting method of claim 12, further comprising:

a relevant authority notifying process in which when an alert disabling event for any one or more of the alarm issued by a boiler leak processing unit and the alert issued through a user mobile terminal does not occur for a predetermined time, the alert controller transmits CO leak notification information through the communication unit to a relevant authority server of a relevant authority connected to a wired or wireless data communication network.

* * * * *